Patented June 5, 1951

2,555,684

UNITED STATES PATENT OFFICE 2,555,684

COMPOSITIONS FOR TREATING LEATHER AND TEXTILES

Arthur De Castro, Irvington, and Clinton Edward Retzsch, Bloomfield, N. J., assignors to Nopco Chemical Company, Harrison, N. J., a corporation of New Jersey No Drawing. Application March 26, 1949, Serial No. 83,756

13 Claims. (Cl. 252—8.57)

The present invention relates to novel compositions of matter which are highly superior fat liquoring agents for the fat liquoring of animal skins, hides, kips and pelts, all of which are hereinafter described by the term "skins" in its general sense, and which are excellent textile softening agents.

Although leather has been manufactured from skins for centuries and many compositions have been devised to replace the natural oils or fats which are removed from the skins in the tanning of leather, there is a constant demand for the improvement of fat liquoring compositions. Among the many difficulties encountered in fat liquoring are the tendency of the fat liquoring emulsions to break or separate, the necessity of employing additives in many cases to insure an adequate absorption of oil by the skins, and in the case of fat liquoring of white leather the yellowing of the resulting leather immediately after the leather has been fat liquored or upon ageing. Alum-tanned leather has proved to be especially difficult to fat liquor because very few fat liquoring emulsions are stable in the presence of alum and sodium chloride. In addition, some fat liquoring agents will not exhaust or discharge themselves completely onto the skins being fat liquored. Difficulties have also arisen from poor penetration of the fat liquoring agents into the skins under treatment resulting in improper distribution of the softening oils through the leather.

It is the object of this invention to provide highly improved compositions for fat liquoring skins.

Another object of the invention is to provide compositions which are capable of forming stable fat liquor emulsions.

A further object of the invention is to provide improved textile softening agents.

Other objects of the invention will in part be obvious and will in part appear hereinafter.

The present invention is concerned with a novel composition of matter which comprises a sulfated alcohol of the group consisting of sulfated unsaturated fatty alcohols and sulfated blown unsaturated fatty alcohols, a sulfated monoamide prepared by sulfating an amide obtained by reacting an alkylolmonoamine with fatty acid, water, and an oleaginous softening material.

The compositions of the present invention possess many outstanding advantages for the treatment of skins. Their stability over a wide range of conditions permits their use with leathers produced by a wide variety of tannages such as alum, chrome, alum-formaldehyde, melamine-formaldehyde-alum, zirconium, alum-vegetable, and the recently developed syntans. In addition, the new products are stable over a broad range of acidity; therefore, it is possible with the compositions of the present invention to carry out the fat liquoring of leather without removing the leather from the tanning bath. The compositions of the invention are stable to pH values as low as 2 and thus they may be added to the tanning baths without any danger of their being coagulated or causing the emulsions thereof to break. This is a highly valuable and unusual property. Furthermore, these compositions remain completely stable in the presence of the tanning bath constituents even when the tanning bath is adjusted to a pH value approaching neutrality. The only other fat liquoring compositions of which we are aware which are sufficiently stable to be added directly to the tanning bath are relatively stable as long as the tanning bath is kept in a fairly acid condition but those prior art compositions become unstable and the emulsions thereof tend to break as soon as the pH of the tanning bath is adjusted to a value approaching neutrality. The compositions of the present invention are far more stable and are stable over a much wider range of pH values than the prior art fat liquoring compositions which have been used to fat liquor skins directly in the tanning bath. Not only are the products of the invention stable over a wide range of acidic pH values but they are also very stable under alkaline conditions since the compositions themselves have an alkaline pH. This is a very valuable property inasmuch as such a composition is exceptionally well adapted to the fat liquoring of furs. The reason for this is that after furs have been fat liquored they are subjected to a process known as "killing" to make the fur more easily and uniformly dyeable. This killing process involves subjecting the furs to the action of a relatively strong alkali which tends to remove oily materials from the individual hairs on the fur. If such oil is not removed from the hair, the hair does not dye properly and evenly. If the fat liquoring composition which has been used to fat liquor the furs is not relatively stable to alkali, this killing process will not remove the oily material from the hairs of the fur but instead it will cause a coagulation of the residual oil upon the hair in such a manner that it cannot be removed. Such a result, of course, is highly undesirable as it leads to a very uneven dyeing. Since the products of our invention are relatively stable to alkali, furs which have been fat liquored therewith are not affected detrimentally in any manner by such a killing process. Even when alum tanned skins are not fat liquored in the tanning bath, it has been necessary in the past to fat liquor them at a relatively low pH value, i. e. a pH value of from about 3 to about 5.0 in order to obtain the most efficient results since the prior art fat liquoring emulsions, when applied to alum tanned skins, become quite unstable if the pH becomes any greater than about 5; however, a greater degree of softness is obtained from the same amount of oil when skins are fat liquored at what is considered in the leather art as a relatively high pH as, for instance, a pH of 6. An alternate advantage of high pH fat liquoring is that a smaller quantity of oil is required in such a case than would be required at a lower pH to give a product of the same degree of softness. In view of the great stability of the compositions of the present invention over a wide range of pH values and at such relatively high pH values, they are eminently suitable for high pH fat liquoring. Another very outstanding feature of this invention is that when white leather is fat liquored with the compositions of the invention, leather of outstanding whiteness is obtained and this whiteness is not lost in the period of many months which usually elapses between the manufacture of the leather and the manufacture of shoes, gloves and other articles from that leather. White leather produced as hereinafter described has withstood accelerated ageing tests for 72 hours in a "Fade-Ometer" (an accelerated ageing device sold by Atlas Electric Devices of Chicago, Ill.) without developing the slightest tinge of yellowness or displaying any other defects. This is a very severe ageing test and such great resistance of white leathers to ageing has not been obtained heretofore. Moreover, when the compositions of the present invention are used to fat liquor melamine-tanned skins it is not necessary to add an agent such as disodium phthalate to the fat liquoring emulsion to procure a good take up of the fat liquor as has been the case in the prior art.

In addition to their outstanding characteristics as fat liquoring agents we have found that the compositions of our invention possess excellent textile softening properties. Textiles treated with the compositions of our invention have a high degree of softness and a high degree of resistance to yellowing on ageing.

In preparing the compositions of the invention, the sulfated higher unsaturated aliphatic alcohols which are one of the components of our novel compositions may be selected from such alcohols having chain lengths varying from 10 to 22 carbon atoms. Equivalent results are obtained when sulfated blown unsaturated fatty alcohols which have been prepared from unsaturated fatty alcohols having a chain length of from 10 to 22 carbon atoms are used. Inasmuch as the sulfation of alcohols is accomplished by known and well understood procedures, it is not necessary to describe those methods here. Suitable sulfated alcohols include, inter alia, the sulfated derivatives of decylenyl, dodecylenyl, palmitoleyl, oleyl, ricinoleyl, petroselinyl, linoleyl, linolenyl, arachidonyl and erucyl alcohols or mixtures thereof such as sperm alcohols. These alcohols may be in mixtures containing saturated alcohols in substantial quantities, but for best results the unsaturated alcohol content should amount to at least $1/3$ of the total weight of the mixture of alcohols. For the purposes of this invention, the sulfated blown derivatives of any of the aforementioned unsaturated alcohols may be substituted wholly or in part for the aforementioned sulfated unblown alcohols. Where a blown alcohol is used, the amount of blowing and hence the degree of oxidation and polymerization of the alcohol is a matter of choice so long as the alcohol remains fluid at temperatures as low as 40° F. The degree of sulfation of the alcohol is important in obtaining the benefits of this invention and the blown or unblown alcohol should have an organic $SO_3$ content of at least 10% by weight on a dry basis and may contain any amount of $SO_3$ above 10% up to the maximum amount of $SO_3$ which may be combined with the alcohol. In general, the higher the $SO_3$ content of the alcohol, the better will be the results which will be obtained with the compositions of the invention.

The sulfated alkylolmonoamides which are employed in preparing the compositions of the invention will hereinafter usually be termed "sulfated amides" for brevity. These substances are the sulfated products of the condensation of fatty acyl materials containing from 8 to 22 carbon atoms per acyl chain with alkylolmonoamines in approximately equal ratios of acid and amine equivalents. The expression "fatty alkylolmonoamide" describes the structure of the material prior to sulfation. The sulfated product, of course, may contain no free hydroxyl groups due to the sulfation of one or more of such groups in the sulfation reaction. The number of free hydroxyl groups present, if any, will depend, of course, upon the extent to which the alkylolmonoamide has been sulfated. The reaction conditions for condensing a fatty acyl substance and an alkylolamine to form a fatty alkylolamide are simple and well understood. It is only necessary to raise the temperature of the mixture of the reactants until moisture is evolved and continue this heating until approximately the theoretical quantity of water which is formed in the reaction has been collected. Such a fatty alkylolamide which is to be used in preparing the compositions of the invention is sulfated with concentrated sulfuric acid or other known sulfating agents at a moderately elevated temperature, in accordance with well known procedures, to an organic $SO_3$ content of at least 8% by weight, and preferably to an organic $SO_3$ content of from 12% by weight up to the maximum amount of $SO_3$ which may be combined with the alkylolamide.

A wide variety of fatty acylating materials may be used in preparing the alkylolamides. Fatty glycerides, esters, acids, acyl halides and mixtures of any of these are all suitable. Among the many such materials, to name only a few, are: peanut, soybean, cottonseed, coconut and castor oils; capric, lauric, myristic, palmitic, stearic, oleic, linolenic, linoleic, arachidic and behenic acids; and methyl caprylate, ethyl oleate, butyl palmitate, lauroyl chloride and stearoyl bromide.

Of the alkylolamines which are suitable for preparing the amides, it is preferred to employ monoethanolamine and monoisopropanolamine; however, a number of other alkylolamines such as diethanolamine, diisopropanolamine, 2-methyl-2-amino-1-propanol, ethyl ethanolamine and butyl ethanolamine may also suitably be used. The amine must be a monoamine and must contain a primary or secondary amine group and it must contain at least one hydroxy group. Tertiary amines are not suitable because they do not form amides, and polyamines are not suitable since they would form amine salts instead of sulfates during the sulfation reaction; hence neither the tertiary amines nor the polyamines may be used for preparing the amides to be used in the compositions of the invention.

The compositions of the invention ordinarily contain water in an amount approximately equal to or slightly greater than the combined dry weight of the sulfated amide and the sulfated alcohol contained in the compositions. However, the amount of water present usually need be no more than about 50% of the combined dry weight of the sulfated amide and sulfated alcohol. The water permits the use of the soluble components in their most readily available form, and permits the manufacture of a clear, stable soluble oil. While it would be possible to use the components each in an anhydrous condition, such an expedient would be more costly and less convenient. The maximum amount of water in the compositions is purely a matter of choice, of course, since the compositions as used by the tanner ordinarily are used in the form of aqueous emulsions containing only about 3% to 5% of non-aqueous materials. Therefore the products may be prepared containing any amount of water up to the amount which would be present when the compositions are used for fat liquoring. For the purpose of economy in shipping charges, however, it is preferred that the products as prepared for sale to the leather trade contain no more than a total of about 50% of water.

The oleaginous softening material which is used in preparing the compositions of the invention may be any of the well known softening oils or fats, either alone or in admixture, which have been employed in the past for the fat liquoring or oiling of hides and skins. Suitable oils, inter alia, are neatsfoot oil, cod oil, fluid mineral oils as exemplified by paraffin oil and white mineral oil, rice bran oil, sperm oil, olive oil, coconut oil, teaseed oil, corn oil, peanut oil, and blown oils such as blown soya, corn, mustardseed, peanut and cottonseed oils. When the compositions of the invention are to be used to fat liquor white leathers or are to be used as textile softening agents, dark colored oils such as cod oils should not be incorporated into the compositions. Such dark colored oils are perfectly suitable, however, when using the compositions to fat liquor dark colored leathers. The term "oleaginous softening material" as used in the specification and claims includes all of the above oils and fats as well as suitable mixtures thereof, and it also includes oils and fats which have not been specifically listed hereinabove but which are of essentially the same nature as those oils and fats which have been specifically listed. These substances lubricate and soften the skins in proportion to the amount of oil used per unit weight of skin.

Although not essential to the present invention, it is desirable to include in the compositions of the invention small amounts of agents which promote stability and mutual solubility of the constituents. Such agents are conventionally used in emulsion technology and are often described as adjusting or blending agents. Among such agents which are suitable for use in the compositions of the present invention, there may be mentioned fatty acids, esters of fatty acids, and amine and ammonia soaps of fatty acids. When the compositions of the invention are used to fat liquor white leather, it is preferred that any stabilizing agents which are incorporated therein be either ammonia or triethanolamine soaps of coconut fatty acids. In addition to their adjusting or stabilizing effects, it is believed that the various stabilizing agents contribute directly to the lubrication and softening of the leather; therefore, the fatty acid content of these stabilizers is included along with the amount of oleaginous softening materials present when calculating the total quantity of softening material which is present in the compositions of the invention. When such blending agents are employed they are usually used in amounts varying from about 1% to about 15% of the non-aqueous weight of the compositions.

To obtain the best results, it is essential to compound the fat liquoring mixtures from certain proportions of ingredients. In order to secure the desired emulsifying and penetrating properties, the sulfated amides should comprise from about 20% to about 80% by weight of the total quantity of sulfated amides and sulfated alcohols. One hundred parts by weight of such mixtures may then be incorporated with from about 20 parts to about 240 parts by weight of the oleaginous softening materials; however, the preferred quantity of these softening materials in the compositions of the invention ranges from about 40 parts to about 120 parts of such materials per 100 parts of the mixture of sulfated amide and sulfated alcohol, and it is especially desirable to keep within the narrower proportions where the leather to be fat liquored has been tanned with an agent which breaks emulsions readily as, for example, alum tannage. In connection with the aforementioned quantities, it should be borne in mind that they are given herein on the basis of dry active constituents. The ability of the mixtures of sulfated amides and sulfated alcohols to stably emulsify rather widely varying quantities of the oleaginous softening materials is a valuable characteristic since it permits marketing the fat liquoring composition with a comparatively small quantity of the oleaginous softening materials incorporated therein. Then where firm leather is desired, the tanner may simply stir the composition into the proper amount of water and proceed to fat liquor the hides and skins. In cases where a softer and more supple leather is sought, the compositions of the present invention are equally suitable since the tanner has only to add to the compositions an amount of an oleaginous softening material sufficient to adjust the total amount of oleaginous softening material in the compositions to a figure which will give the desired softening effect.

The novel preparations of the invention have been used chiefly in the production of light colored leathers; however, they are also exceedingly suitable for fat liquoring leather which has been tanned with any of the syntans and darker mineral tanning agents or combinations of such agents with vegetable tanning agents.

As has been pointed out heretofore, the essential ingredients of our compositions are a sulfated alkylolmonoamide, a sulfated unsaturated fatty blown or unblown alcohol, water, and an oleaginous softening material. Numerous substances are desirable additives for various purposes such as preservatives, antioxidants, etc., and mixtures including such materials are within the scope of this invention. For instance, formaldehyde may be added to these new compositions to prevent bacterial action from occurring in the products upon prolonged storage. It is further contemplated that any compatible substances used heretofore in the processing of leather may be used along with our novel compositions of matter when they are employed as fat liquoring agents. For example, as shown by the examples given hereinafter, pigments such as titanium dioxide and other agents for whitening leather may be incorporated into leather in the presence of the compositions of the invention.

For a fuller understanding of the nature and objects of the invention, reference may be had to the following examples which are given merely as further illustrations of the invention and are not to be construed in a limiting sense. The procedure used in preparing the compositions of all of the examples is detailed in Example I.

Example I

| | Parts by weight |
|---|---|
| 50% aqueous solution of sulfated oleyl alcohol (technical grade)—15.0% organic $SO_3$ on dry basis | 40.0 |
| 45% aqueous solution of sulfated monoethanolamides of coconut fatty acids—calculated organic $SO_3$ content on dry basis of 16.5% | 34.0 |
| Paraffin oil—280 Bé. | 10.0 |
| Coconut oil fatty acids | 6.0 |
| Ammonium hydroxide—28% $NH_3$ approx. | 2.0 |
| Formaldehyde—40% aqueous solution | 0.1 |
| Water | 7.9 |

The sulfated amide, which had an organic $SO_3$ content of approximately 16.5%, was prepared by melting 15 parts of the monoethanolamide of coconut fatty acids and slowly stirring the melted amide into 18 parts of 98% sulfuric acid while maintaining the reaction temperature at 65° C. during the admixing and for 15 minutes thereafter; then the reaction products were neutralized with alkali in an ice bath.

In preparing the composition of the invention, the sulfated alcohol and paraffin oil was heated to 70° C. with stirring until the mixture was homogeneous; then the sulfated amide was added with stirring until the mixture was again uniform. The coconut fatty acids were introduced next and the heating and stirring of the mass was continued until this material had melted and the mixture was uniform again. After cooling to between 45° and 50° C. the ammonium hydroxide was then slowly added to the composition. The water and aqueous formaldehyde were next stirred in and the final composition was a clear amber liquid at room temperature.

White leather which was fat liquored with an aqueous emulsion containing 6% of the product prepared in the above manner had an excellent feel and an outstanding whiteness. When this leather was subjected to an accelerated ageing test in a "Fade-Ometer," it showed absolutely no signs of discoloration after a period of 72 hours.

The above composition was very stable in strong acid solutions and was very stable to inorganic salts as was shown by the fact that it remained completely stable when from 5% to 10% of it was added to an aqueous solution containing 20% of alum and 10% of sodium chloride.

Example II

| | Parts by weight |
|---|---|
| 50% aqueous solution of sulfated oleyl alcohol—15% organic $SO_3$ on dry basis | 40.0 |
| 45% aqueous solution of sulfated monoethanolamides of coconut fatty acids—calculated organic $SO_3$ content on dry basis of 16.5% | 35.0 |
| Paraffin oil—28° Bé | 12.0 |
| Oleic acid | 3.0 |
| Ammonium hydroxide—28% $NH_3$, approx. | 2.0 |
| 40% aqueous formaldehyde solution | 0.1 |
| Water | 7.9 |

The above materials were compounded in the manner indicated in Example I to produce a fat liquor having essentially the same excellent characteristics as the product of Example I. This composition was also found to be completely stable in an aqueous solution containing 20% of alum and 10% of sodium chloride.

Example III

| | Parts by weight |
|---|---|
| 50% aqueous solution of sulfated oleyl alcohol (technical grade)—15.0% organic $SO_3$ on dry basis | 2.400 |
| 45% aqueous solution of sulfated monoethanolamides of coconut fatty acids—calculated organic $SO_3$ content on dry basis of 16.5% | 2.040 |
| Paraffin oil—28° Bé | 0.600 |
| Coconut oil fatty acids | 0.360 |
| Ammonium hydroxide—28% $NH_3$, approx. | 0.120 |
| Formaldehyde—40% aqueous solution | 0.006 |
| Water | 0.474 |
| Neat's-foot oil—20° F. cold test | 1.500 |

Melamine-tanned kip skins of pH 3.7 to 3.8 were washed for 10 minutes with water at 110° F. and drained. 100 parts of the white leather were added to 100 parts of water at 120° F. in a fat liquoring drum. The entire quantity of the above composition was added and the drum was rotated for 45 minutes. Then the leathers were removed to drain and the spent liquor was examined to determine the degree of exhaustion. After draining, the leathers were then wrung and tacked to dry. It was observed that the fat liquor was completely exhausted and also that the leather had a good feel and was very satisfactory in color.

Example IV

| | Parts by weight |
|---|---|
| 50% aqueous solution of sulfated blown oleyl alcohol (technical grade)—15% organic $SO_3$ on dry basis | 2.400 |
| 45% aqueous solution of sulfated monoethanolamides of coconut fatty acids—calculated organic $SO_3$ content on dry basis of 16.5% | 2.040 |
| Paraffin oil—28° Bé | 0.600 |
| Coconut oil fatty acids | 0.360 |
| Ammonium hydroxide—28% $NH_3$, approx. | 0.120 |
| Formaldehyde—40% aqueous solution | 0.006 |
| Water | 0.474 |

The procedure of Example III was duplicated exactly except for the substitution of this fat liquoring composition. The exhaustion of the fat liquor was again complete and the resulting leather had a very good color and was somewhat firmer than the product of Example III.

Example V

The procedure of Example IV was duplicated exactly except that the quantity of the entire fat liquoring composition of Example IV was doubled. The fat liquor was substantially completely exhausted, and the product was softer than the leather of Example III. The leather was of outstanding whiteness.

Example VI

| | Parts by weight |
|---|---|
| 50% aqueous solution of sulfated oleyl alcohol (technical grade)—15% organic $SO_3$ on dry basis | 3.330 |
| 45% aqueous solution of sulfated monoethanolamides of coconut fatty acids—calculated organic $SO_3$ content on dry basis of 16.5% | 1.275 |
| White mineral oil—85 S. S. U./100° F | 0.720 |
| Coconut oil fatty acids | 0.180 |
| Water | 0.495 |
| Neat's-foot oil—20° F. cold test | 1.500 |

Leather of the same type and the same tannage as that of Example III but having a pH value of 4.0 was fat liquored as in the previously described manner with the composition listed immediately above. The fat liquor was very well discharged and the leather upon drying was observed to have a good color and the well lubricated surface feel which is desirable for many types of shoe leathers.

Example VII

| | Parts by weight |
|---|---|
| 50% aqueous solution of sulfated blown oleyl alcohol (technical grade)—15% organic $SO_3$ on dry basis | 1.110 |
| 45% aqueous solution of sulfated monoethanolamides of coconut fatty acids—calculated organic $SO_3$ content on dry basis of 16.5% | 3.825 |
| White mineral oil—85 S. S. U./100° F | 0.720 |
| Coconut oil fatty acids | 0.180 |
| Water | 0.165 |
| Neat's-foot oil—20° F. cold test | 1.500 |

The procedure of Example VI was repeated using this formula and the fat liquor was completely exhausted. The leather produced was substantially identical in feel and color to that of Example VI.

Example VIII

A composition similar to that of Example III was prepared with triethanolamine in chemically equivalent quantity being substituted for the ammonium hydroxide. Melamine-tanned side leather with a pH of 4.45 was fat liquored as before. The take up of the fat liquor was complete and the leather was found to be soft with a dry surface feel and a very good color.

Example IX

| | Parts by weight |
|---|---|
| 50% aqueous solution of sulfated oleyl alcohol (technical grade)—15% organic $SO_3$ on dry basis | 3.200 |
| 45% aqueous solution of sulfated monoethanolamides of coconut fatty acids—calculated organic $SO_3$ content on dry basis of 16.5% | 2.720 |
| Paraffin oil—28° Bé | 0.800 |
| Coconut fatty acids | 0.480 |
| Ammonium hydroxide—28% $NH_3$, approx | 0.160 |
| Formaldehyde—40% aqueous solution | 0.008 |
| Water | 0.632 |
| Neat's-foot oil—20° F. cold test | 2.000 |

Kid skins which had been tanned with melamine-tannage, neutralized to pH 4.27 and thereafter washed were placed in a fat liquoring drum. For each 100 parts by weight of the wet skins, 100 parts by weight of water at 130° F. and all of the above fat liquoring agent were added. After drumming the leather for 30 minutes, it was noted that all of the oil had been taken up. Two percent titanium dioxide was then added and the drum was rotated for an additional 15 minutes. After completely finishing the leather, it was found to be very satisfactory in regard to softness, whiteness and proper penetration of the oil and especially suitable for the production of suede leather by abrasion.

Example X

Kid skins tanned with alum and formaldehyde were fat liquored with the composition and in the manner indicated in Example IV. Exhaustion of the fat liquor was complete and a uniformly white leather free of oil spots was obtained. This leather sueded very readily.

Example XI

Pickled splits were placed in a drum with an equal weight of water to which had been added 7% of sodium chloride (note all weights given are based on the weight of the pickled stock).

The drum was run for 15 minutes after which 5% of formaldehyde (40% aqueous formaldehyde) was added and the drum was then run 20 minutes more. The pH was then raised to 6.8 by the addition of a total of 5½% of sodium bicarbonate in four portions at 15 minute intervals. The drum was then run for 1 hour and allowed to stand overnight.

The following morning the drum was run for 1½ hours after which the leather was drained. It was then washed 20 minutes in cold water and redrained.

The leather was then floated once more in an equal weight of water to which was added:

7% aluminum sulfate .18$H_2O$
6% sodium formate
5% sodium chloride

This was drummed for 2 hours and then the following fat liquoring composition was added to the drum:

| | Parts by weight |
|---|---|
| 50% aqueous solution of sulfated oleyl alcohol (technical grade)—15% organic $SO_3$ on dry basis | 2.400 |
| 45% aqueous solution of sulfated monoethanolamides of coconut fatty acids—calculated organic $SO_3$ content on dry basis of 16.5% | 2.040 |
| Paraffin oil—28° Bé | 0.600 |
| Coconut fatty acids | 0.360 |
| Ammonium hydroxide—28% $NH_3$, approx | 0.120 |
| Formaldehyde—40% aqueous solution | 0.006 |
| Water | 0.474 |
| Coconut oil | 1.000 |

The drumming was continued for one hour and then the pH was raised to 6.2 by the addition of a total of 4% of sodium bicarbonate in two portion at 15 minute intervals.

At this point, 10% of a white pigment known as Titanolith was added and drumming continued for 30 minutes at which point the stock was removed and horsed up to drain. The oil take-up was complete and the leather was of a very desirable nature for white shoe upper splits.

Example XII

Zirconium-tanned goat skins of pH 5.25 were fat liquored for 30 minutes in water at 140° F. according to the procedure and with the agent used in Example IV. The pH at this time was found to be 4.5. A mixture of 2 parts of titanium dioxide, 3 parts of colloidal clay, and 3 parts of flour per 100 parts of wet skins was added and drumming was continued for an additional 20 minutes. The leather when dry was found to be firm, well lubricated and of exceptionally white color.

Example XIII

| | Parts by weight |
|---|---|
| 50% aqueous solution of sulfated oleyl alcohol (technical grade)—15% organic SO$_3$ on dry basis | 2.400 |
| 45% aqueous solution of sulfated monoethanolamides of coconut fatty acids—calculated organic SO$_3$ content on dry basis of 16.5% | 2.040 |
| Paraffin oil—28° Bé | 0.600 |
| Coconut fatty acids | 0.360 |
| Ammonium hydroxide 28% NH$_3$ | 0.120 |
| Formaldehyde—40% aqueous solution | 0.006 |
| Water | 0.474 |
| Blown soyabean oil | 0.500 |
| Butyl oleate | 0.500 |

This composition was employed in treating the same leather and according to the same procedure as in Example XII except that the skins were removed after drumming for 30 minutes. The fat liquor was completely exhausted, and the resulting leather was of excellent whiteness and was quite soft and supple.

Example XIV

Cotton sheeting was treated with a softening composition made up of an aqueous dispersion containing 3% of the following composition:

| | Parts by weight |
|---|---|
| 50% aqueous solution of sulfated blown oleyl alcohol having an organic SO$_3$ content of 15% on dry basis | 40.0 |
| 45% aqueous solution of sulfated monoethanolamides of coconut fatty acids—calculated organic SO$_2$ content on dry basis of 16.5% | 34.0 |
| Paraffin oil—28° Bé | 10.0 |
| Coconut fatty acids | 6.0 |
| Aqueous ammonium hydroxide—28% NH$_3$ | 2.0 |
| Formaldehyde—40% aqueous | 0.1 |
| Water | 7.9 |

The treated product had an excellent degree of softness and a high degree of resistance to yellowing.

Example XV

Another sample of cotton sheeting was softened with a 3% aqueous dispersion of the product of the previous example except that 50 parts of peanut oil were incorporated into the product thus giving a total of 66 parts of oleaginous softening material in the total of 150 parts of product. The resulting softened sheeting had a degree of resistance to yellowing which was even higher than that of the sheeting treated with the product of the previous example. The softening effect of the product of this example was just as outstanding as the product of the previous example.

It is to be understood that in the following claims ingredients or components recited in the singular are intended to include compatible mixtures of such ingredients.

Having described our invention, what we claim as new and desire to secure by Letters Patent is:

1. A composition of matter which comprises from about 20 to about 240 parts by weight of an oleaginous softening material, 100 parts by weight of a mixture consisting of from about 20 to about 80 parts of a sulfated alkylolmonoamide of a fatty acid with the balance of the mixture being a sulfated alcohol of the group consisting of sulfated unsaturated fatty alcohols and sulfated blown unsaturated fatty alcohols, and at least 50 parts of water.

2. A composition of matter which comprises from about 40 to about 120 parts by weight of an oleaginous softening material, 100 parts by weight of a mixture consisting of from about 20 to about 80 parts of a sulfated alkylolmonoamide of a fatty acid with the balance of the mixture being a sulfated alcohol of the group consisting of sulfated unsaturated fatty alcohols and sulfated blown unsaturated fatty alcohols, and at least 50 parts of water.

3. A composition according to claim 1 in which the oleaginous softening material comprises neat's-foot oil.

4. A composition according to claim 1 in which the oleaginous softening material comprises mineral oil.

5. A composition according to claim 1 in which the sulfated fatty amide comprises the sulfated monoethanolamides of coconut oil fatty acids.

6. A composition according to claim 1 in which the sulfated alcohol comprises a sulfated oleyl alcohol.

7. A composition according to claim 1 which contains from about 1% to about 15% based on the weight of the total non-aqueous materials in the composition of a fatty acid soap selected from amine soaps of fatty acids and ammonia soaps of fatty acids.

8. A composition according to claim 2 in which the oleaginous softening material comprises neat's-foot oil.

9. A composition according to claim 2 in which the oleaginous softening material comprises mineral oil.

10. A composition according to claim 2 in which the sulfated fatty amide comprises the sulfated monoethanolamides of coconut oil fatty acids and the sulfated alcohol comprises a sulfated oleyl alcohol.

11. A composition according to claim 2 which contains from about 1% to about 15% based on the weight of the total non-aqueous materials in the composition of a fatty acid soap selected from amine soaps of fatty acids and ammonia soaps of fatty acids.

12. A composition of matter which comprises from about 40 to about 120 parts of neat's-foot oil, 100 parts of a mixture consisting of from about 20 to about 80 parts of sulfated monoethanolamides of coconut fatty acids with the balance of the mixture being a sulfated oleyl alcohol, at least 50 parts of water, and from about 1% to about 15% based on the weight of the total non-aqueous materials in the composition of a fatty acid soap selected from amine soaps of fatty acids and ammonia soaps of fatty acids.

13. A composition of matter which comprises from about 40 to about 120 parts of mineral oil, 100 parts of a mixture consisting of from about 20 to about 80 parts of sulfated monoethanolamides of coconut fatty acids with the balance of the mixture being a sulfated oleyl alcohol, at least 50 parts of water, and from about 1% to about 15% based on the weight of the total non-aqueous materials in the composition of a fatty acid soap selected from amine soaps of fatty acids and ammonia soaps of fatty acids.

ARTHUR DE CASTRO.
CLINTON EDWARD RETZSCH

REFERENCES CITED

The following references are of record in the file of this patent:

UNITED STATES PATENTS

| Number | Name | Date |
| --- | --- | --- |
| 2,115,509 | Jaeger | Apr. 26, 1938 |
| 2,140,882 | Rosenbrock et al. | Dec. 20, 1938 |
| 2,180,133 | Arnold, Jr. | Nov. 14, 1939 |